US012619776B2

(12) United States Patent
Shah et al.

(10) Patent No.: US 12,619,776 B2
(45) Date of Patent: May 5, 2026

(54) ANONYMIZING PERSONALLY IDENTIFIABLE INFORMATION IN STORED DATA

(71) Applicant: International Business Machines Corporation, Armonk, NY (US)

(72) Inventors: Anjali Shah, Short Hills, NJ (US); Neil Delima, Scarborough (CA); Suman Patra, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 17/406,622

(22) Filed: Aug. 19, 2021

(65) Prior Publication Data

US 2023/0057547 A1 Feb. 23, 2023

(51) Int. Cl.
| | |
|---|---|
| *G06F 21/62* | (2013.01) |
| *G06V 10/82* | (2022.01) |
| *G06V 20/40* | (2022.01) |
| *G06V 40/16* | (2022.01) |
| *H04N 5/262* | (2006.01) |

(52) U.S. Cl.
CPC .......... *G06F 21/6254* (2013.01); *G06V 20/49* (2022.01); *H04N 5/262* (2013.01)

(58) Field of Classification Search
CPC .... G06F 21/6254; G06V 20/49; G06V 10/82; G06V 40/161; G06V 40/171; H04N 5/262
See application file for complete search history.

(56) References Cited

U.S. PATENT DOCUMENTS

| | | | |
|---|---|---|---|
| 8,627,483 B2 | 1/2014 | Rachlin | |
| 8,890,937 B2 | 11/2014 | Skubic | |
| 9,298,878 B2 | 3/2016 | Guirguis | |
| 9,361,481 B2 | 6/2016 | Lafever | |
| 9,449,432 B2 | 9/2016 | Kanaujia | |
| 9,485,472 B2 | 11/2016 | Periyasamy | |
| 9,582,680 B2 | 2/2017 | Bilodeau | |
| 9,600,073 B2 | 3/2017 | Cardonha | |
| 9,600,727 B2 | 3/2017 | Migdal | |
| 10,176,196 B2 * | 1/2019 | Li | G06F 16/951 |
| 10,460,120 B1 * | 10/2019 | Stephens | G06F 16/185 |
| 2008/0181533 A1 | 7/2008 | Jung | |
| 2016/0379010 A1 | 12/2016 | Farkash | |
| 2018/0115797 A1 * | 4/2018 | Wexler | H04L 67/535 |
| 2018/0268240 A1 * | 9/2018 | Loce | G06F 21/6254 |

(Continued)

FOREIGN PATENT DOCUMENTS

| | | |
|---|---|---|
| CN | 108596265 A | 9/2018 |
| EP | 3188058 A1 | 7/2017 |
| KR | 101648188 B1 | 8/2016 |

OTHER PUBLICATIONS

"We're Live—Live TV Face Substitution", downloaded from the Internet on Aug. 17, 2021, 2 pps., <https://blairneal.com/portfolio_page/were-live-live-tv-face-substitution/>.

(Continued)

*Primary Examiner* — Andrew Suh

(74) *Attorney, Agent, or Firm* — David K. Mattheis

(57) ABSTRACT

Obfuscating image data by receiving a plurality of video image frame data, detecting an object within a frame, generating a key associated with the object, matching the key to a key/value pair in a key store, generating a revised frame by replacing the object with the value, and providing the revised frame.

20 Claims, 4 Drawing Sheets

200

(56) References Cited

U.S. PATENT DOCUMENTS

| | | | | |
|---|---|---|---|---|
| 2019/0066493 | A1* | 2/2019 | Sohn | G06N 3/08 |
| 2020/0117906 | A1* | 4/2020 | Lee | G06V 10/764 |
| 2020/0373002 | A1* | 11/2020 | Kadambi | G16H 30/40 |
| 2021/0134436 | A1* | 5/2021 | Meyer | G16H 50/20 |
| 2022/0067361 | A1* | 3/2022 | Hoehne | G06V 30/414 |
| 2023/0198745 | A1* | 6/2023 | Vansteenkiste | H04W 12/02 |
| | | | | 713/168 |

OTHER PUBLICATIONS

Bitouk et al., "Face Swapping: Automatically Replacing Faces in Photographs", 8 pps, downloaded from the Internet on Aug. 17, 2021, <https://www.cs.columbia.edu/CAVE/publications/pdfs/Bitouk_SIGGRAPH08.pdf>.

Blanch et al., "End-to-End Conditional GAN-based Architectures for Image Colourisation", arXiv:1908.09873v2 [eess.IV], Sep. 5, 2019, 6 pps., <https://arxiv.org/pdf/1908.09873.pdf>.

Kusama et al., "Mosaic-based Privacy-protection with Reversible Watermarking", In Proceedings of the 12th International Conference on Signal Processing and Multimedia Applications (SIGMAP-2015), pp. 98-103, ISBN: 978-989-758-118-2, Copyright 2015, SCITEPRESS (Science and Technology Publications, Lda.), <https://scitepress.org/Papers/2015/55625/55625.pdf>.

Maximov et al., "CIAGAN: Conditional Identity Anonymization Generative Adversarial Networks", arXiv:2005.09544v2 [cs.CV], Nov. 30, 2020, 15 pps., <https://arxiv.org/pdf/2005.09544.pdf>.

Mell et al., "The NIST Definition of Cloud Computing", National Institute of Standards and Technology, U.S. Department of Commerce, NIST Special Publication 800-145, Sep. 2011, 7 pages.

Ribaric et al., "An Overview of Face De-identification in Still Images and Videos", 6 pps. Copyright 2015, <https://bib.irb.hr/datoteka/760727.deid1.pdf>.

"Video Anonymization: Protecting Privacy in Documentaries", Deidentification, Printed May 15, 2024, 2:16PM, © All Rights Reserved 2022 D-ID, 3 pages, <https://www.deidentification.co/smart-video-anonymization/>.

Karras et al., "Analyzing and Improving the Image Quality of StyleGAN", arXiv:1912.04958v2 [cs. CV] Mar. 23, 2020, 21 pages, <https://arxiv.org/abs/1912.04958>.

Karras et al., "StyleGAN2—Official TensorFlow Implementation", GitHub, Posted by nurpax, Copyright © 2019, NVIDIA Corporation, printed on May 15, 24, 2:17 PM, 7 pages, <https://github.com/NVlabs/stylegan2>.

Ren et al., "Learning to Anonymize Faces for Privacy Preserving Action Detection", arXiv:1803.11556v2 [cs. CV] Jul. 26, 2018, 17 pages, <https://arxiv.org/abs/1803.11556>.

Ren et al., "Learning to Anonymize Faces for Privacy Preserving Action Detection", European Conference on Computer Vision (ECCV), 2018, 5 pages, <https://jason718.github.io/project/privacy/main.html>.

* cited by examiner

ANONYMIZING PERSONALLY IDENTIFIABLE INFORMATION IN STORED DATA

FIELD OF THE INVENTION

The disclosure relates generally to anonymizing personally identifying information (PII) in stored data. The disclosure relates particularly to anonymizing object features captured in real-time image data.

BACKGROUND

Smart security system services have led to a proliferation of personal data being captured and stored as video streams. Biometric processing services that process face images and underlying face prints enable these security systems to identify individuals from such video streams.

Generative adversarial networks (GAN) typically include two networks, a generator network and a discriminator network. The generator network creates outputs from input noise. The output is passed as an input to the discriminator network. The discriminator network then classifies that generated output as "real" data or as generated or "fake" data. During training the two networks have an adversarial relationship. The generator network seeks to maximize the value of the error associated with the discriminator network output, while the discriminator network seeks to minimize the value of the error. In a well-trained GAN, the discriminator network succeeds in correctly identifying generated output about 50% of the time and fails about 50% of the time.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable obfuscation of personally identifiable information in video data.

Aspects of the invention disclose methods, systems and computer readable media associated with obfuscating image data by receiving a plurality of video image frame data, detecting an object within a frame, generating a key associated with the object, matching the key to a key/value pair in a key store, generating a revised frame by replacing the object with the value, and providing the revised frame.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
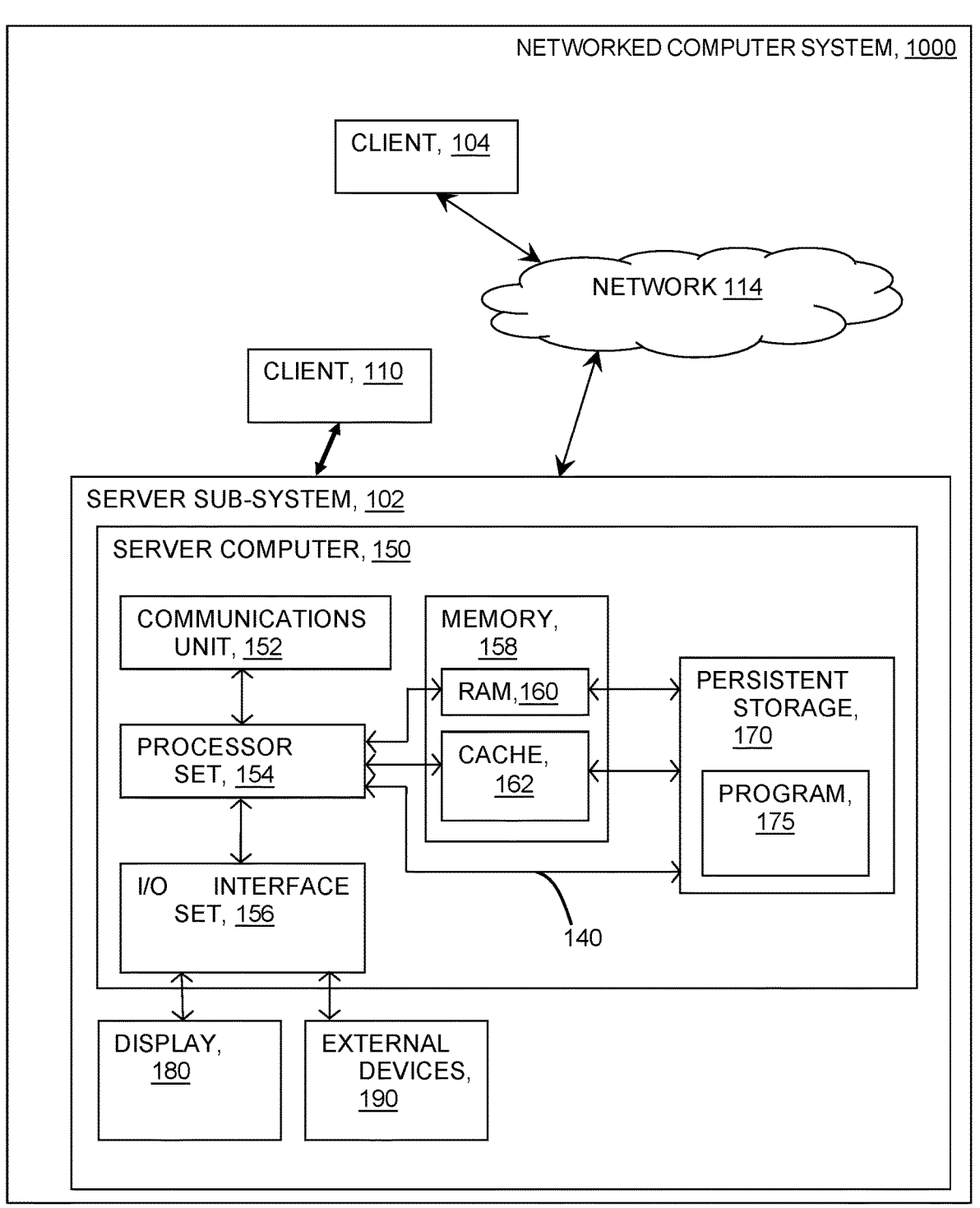
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

This description of the invention includes the example of the replacement of facial images in captured data as a non-limiting example. The scope of the disclosed embodiments may include the detection and replacement of faces, or other identifying objects in the captured data.

Facial/object image data captured in video data streams may be processed for the purposes of facial recognition. Disclosed embodiments enable the storage of captured video data without the accompanying personally identifiable information of individual facial data.

Aspects of the present invention relate generally to revising video data to obfuscate facial/object images rendering facial recognition impossible. Frames of video data are examined; faces and other identifying objects are detected, and generated data is used to replace the detected faces and/or objects on a frame-by-frame basis. Representations of individuals/objects etc. are captured; replacement images are generated and the pairs of original and replacement facial images are stored together. This enables the rapid replacement of those faces with generated images, without the computationally intensive need to continually generate new facial images for the same individual.

In accordance with aspects of the invention there is a method for automatically detecting and replacing facial data with generated data to frustrate facial recognition efforts. The method reviews video image data frame by frame, each frame constituting the same time interval. Facial data and associated boundaries are detected. Vector representations of the facial data are generated and the vector representation is then used to match with records in a database of individual key/value pairings. Each vector representation may be used to generate an individual key representing a single individual's facial characteristics. In an embodiment, the method utilizes an encryption function, such as a hash function, the generate a key from the vector representation of the detected face/object. In this embodiment, the method decrypts the generated key prior to comparing the vector embedding to previously stored values.

If no match is found in the database, the method utilizes a trained generative adversarial network (GAN) to generate a replacement facial image using the detected facial features as an input. The method replaces the detected face with the generated face in the current frame and stores the pairing of the key generated using the vector representation and the generated image (the value) as a key/value pairing in a key store database.

For each subsequent frame including the same face, the method defines the vector representation of the detected face and now finds a match in the key store database. The match includes the previously generated replacement image, which the method uses to replace the face in the current frame. This process repeats for each frame of the video data and all faces detected in the data. The result is a video output similar to the input data except that all recognizable faces in the original have been replaced with generated faces which are not recognizable as the associated individuals.

In determining a match, the method compares vector representations of facial data with stored vector representation keys from previous detections. The method determines the distance or similarity between vectors. Examples of methods of determining the similarity of vector include Jaccard distance, Cosine distance, Euclidean distance, etc. Regardless of lighting changes and image rotations, the distance between two vector embeddings of the same person are less than those of two different persons. Accurate look-ups are possible even if the same person might have been captured in different light conditions, positions or clothing in subsequent video frames.

Aspects of the invention provide an improvement in the technical field of video capture. Disclosed embodiments enable the capture of the generalized activities of a scene without including undesired personally identifiable information in the data. Right of privacy and right of publicity issues arising from downstream uses of captured video can be avoided as the stored video does not include recognizable faces. As an example, stock video taken of a public may capture numerous individuals within the frames. Downstream uses of such video may require clearances from recognizable individuals before use. Disclosed embodiments resolve this issue by providing output video with no recognizable individuals while retaining all other aspects of the original video, including the presence of people.

Aspects of the invention also provide an improvement to computer functionality. In particular, implementations of the invention are directed to a specific improvement to the way video data streams are stored. Embodiments provide for the capture and storage of video which has been cleansed of facial image personally identifiable information. Vector embeddings of facial data detected in each data frame are matched to previously stored embedding of similar data. Matched embeddings result in the use of previously generated images to replace currently detected faces. Unmatched embedding results in the generation of new face images using the current vector embedding as an input, and storage of the generated face for future use when the corresponding face is detected.

In an embodiment, one or more components of the system can employ hardware and/or software to solve problems that are highly technical in nature (e.g., detecting faces in digitized data frames, generating and matching vector representations of detected faces, generating new faces from the vector representations, storing vector embedding—new face combinations for future use replacing detected faces in data frames, etc.). These solutions are not abstract and cannot be performed as a set of mental acts by a human due to the processing capabilities needed to facilitate facial obfuscation, for example. Further, some of the processes performed may be performed by a specialized computer for carrying out defined tasks related to obfuscating facial PII. For example, a specialized computer can be employed to carry out tasks related to obfuscating video facial data or the like.

In an embodiment, the facial obfuscation method receives image data. The following detailed description focuses upon the example of digital video data, but the disclosed embodiments may also be applied to still images. The method parses the received video data into data frames of equal duration. The method then processes each frame in succession.

For each frame the method performs facial detection wherein the data of the frame is scanned to detect data patterns associated with faces. This scanning results in one or more faces and associated facial boundaries being detected in the frame. For each detected face of the frame the method generates a facial feature vector embedding capturing the unique facial features of the detected face. The generated embedding is unique for each detected face and enables differentiating between detected faces.

In this embodiment, the method compares the generated embedding for each face to vector embeddings generated for faces detected in previous frames and subsequently stored in a key/value database. The method uses cosine similarity or similar vector comparison methodologies to determine a distance between the new generated embedding and previously generated and stored embeddings in the database.

In an embodiment, the method utilizes a trained deep learning classification model such as a deep learning neural network, to determine if the new vector embedding matched a previously stored vector embedding. The deep learning classification model is trained using labeled data including vector embeddings—keys of image pairs where a portion of the image pairs are of a single individual and a portion of the image pairs are of different individuals. The image pairs are labeled and used to define the network node weights of the deep learning model through gradient regression. Through the training, the model learns thresholds associated with matched versus unmatched pairs of images such that in use the model determines if a new vector embedding falls below a distance threshold and matches a previously stored embedding.

In an embodiment, embeddings of differing views of an individual (left profile, right profile, head-on, differ enough that defined matching thresholds are exceeded by such pairings. For example, an embedding of a right profile of an individual will exceed the threshold and will not be considered a match for a left profile image of the same individual. In this embodiment, the system stores vector embedding—key and associated GAN generated replacement value pairings for multiple images of an individual associated with facial views sufficiently different that the corresponding vector embeddings fail to indicate a match. In this embodiment, the generated images correspond to the original images such that an original left profile leads to a generated left profile, etc. The use of such multiple replacement images leads to a more realistic video output as all images of a single individual are not simply replaced with the same head-on replacement image regardless of the original orientation of the face in the current frame.

For those vector embeddings—keys which do not match previously stored embeddings—keys, the method generates an initial replacement image using the vector embedding as an input to a generative adversarial model (GAN), trained to generate facial images from facial vector embeddings. The GAN outputs realistic facial images using the vector embedding as an input. Though the facial image outputs are realistic enough to fool the discriminator of the GAN 50% of the time, the images are not recognizable as the original faces underlying the vector embeddings.

The facial obfuscation method captures the vector embedding as a unique key value associated and stores the combination of the key and the GAN generated image as a key/value pairing in a key-value storage database. The key-value storage database provides a mechanism to look-up future occurrences of the same key or similar keys associated with detected images of the same individual. In an embodiment, the method generates a key from the vector embedding. In an embodiment, the method utilizes the vector embedding directly as the key.

For each subsequent frame including the same face, the method detects the face, generates an embedding according to the facial features, generates a key from the vector embedding, and subsequently matches that embedding—key with the previously stored embeddings—keys, using the thresholds defined according to the deep learning model. After matching the new embedding—key to a stored key, the method retrieves the associated stored value from the key-value store and uses the retrieved value (previously generated and stored image) as a replacement for the face in the current data frame.

In an embodiment, the method proceeds frame-by-frame through the video data matching faces to stored values and generating new faces as needed to provide an output video where all faces have been replaced with generated replacement images. The output video may be provided for viewing as well as stored for later viewing or other uses.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise facial obfuscation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data obfuscation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data obfuscation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display revised video data to a user and may be, for example, a computer monitor. Display 180 can also function as a touch screen, such as a display of a tablet computer.

Figure 2:
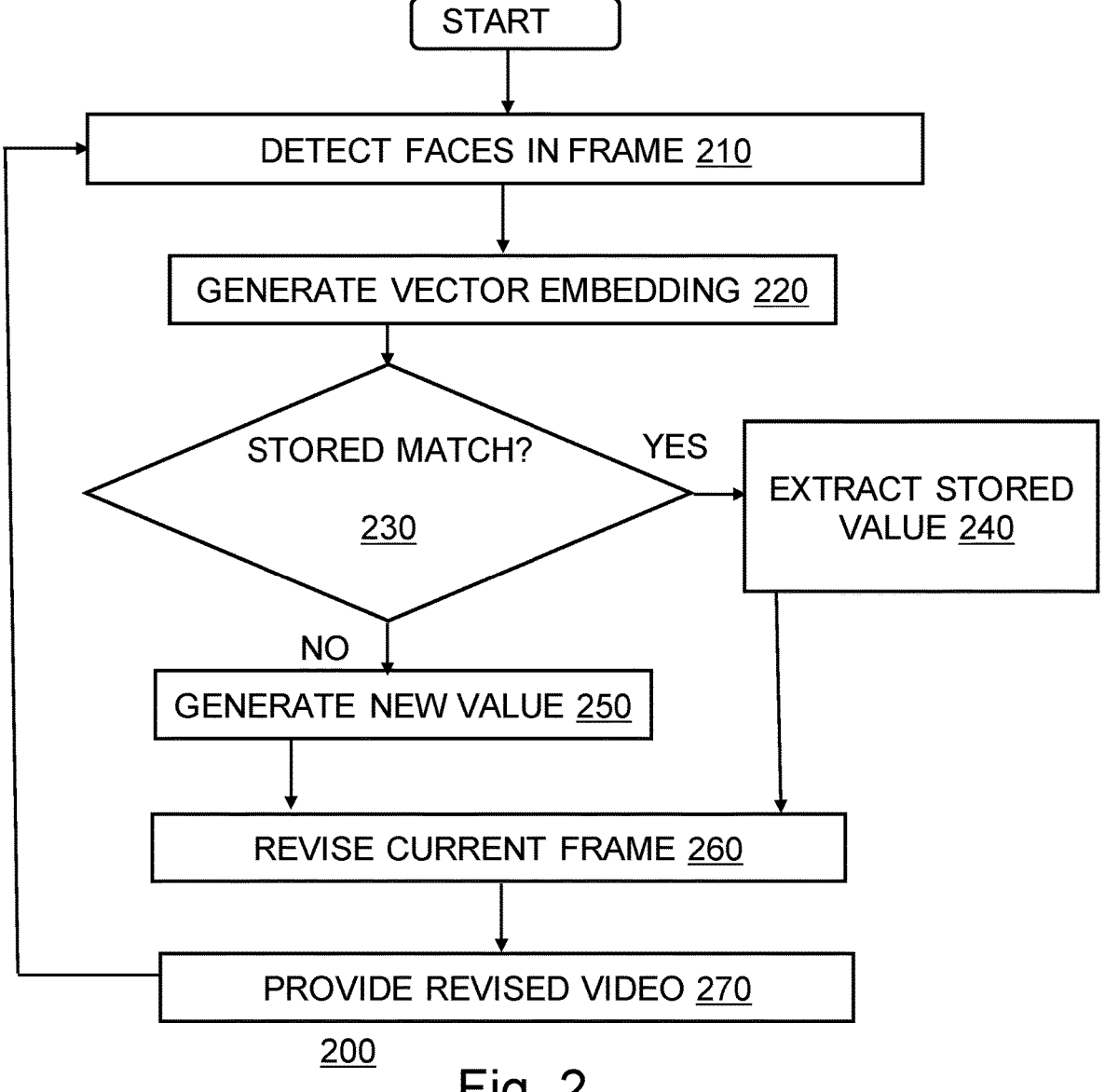
FIG. 2 provides a flowchart depicting an operational sequence, according to an embodiment of the invention.

FIG. 2 provides a flowchart 200, illustrating exemplary activities associated with the practice of the disclosure. After program start, at block 210, the method analyzes video frames one at a time in sequence. The analysis includes application of a face detection algorithm, or object detection algorithms, to detect and outline the boundaries of all faces/objects within the frame.

At block 220, the facial obfuscation method parses the detected objects of the frame and generates a vector embedding corresponding to each detected face of the frame. Vector embedding of images of a single individual or object are more similar than vector embedding of two separate individuals or objects. In this embodiment, the method generates an encrypted key from the generated vector embedding for the detected objects.

At block 230, for each detected face/object the method uses the key generated from the vector embedding of the face/object to check for a similar embedding in the key-value store database using a deep learning classification model.

For faces matching a stored key-value record, the method extracts the corresponding value image from key-value store to block 240. For embeddings without a match, the method proceeds to block 250 where a new image is generated by a GAN using the vector embedding as the input. The new image and a key generated from the underlying vector embedding are passed to the key-value database and stored as a related pairing.

At block 260 the method of data obfuscation program 175 passes the replacement image to a video editor where the editor generates a revised image/frame. The editor replaces the content within the associated face boundary with the replacement generated image from either the GAN or from the key-value database.

At block 270, the method provides the revised frame as output to a video player and/or a video data storage device where the complete stream of revised frames are displayed and/or stored for further use. The method then proceeds to the next sequential data frame and begins again at block 210.

In an exemplary embodiment, a homeowner Bob, has a smart home security camera installed for surveillance and security purposes. The camera captures videos of his family members and all other identifiable people visiting their property. All the video recordings are saved to the Cloud. Through disclosed embodiments, video frames captured by the camera are scanned for facial PII data and this PII data is obfuscated as described above. The modified data is then saved to the cloud rather than the original PII containing, video data. The modified video streams can be stored without concerns for privacy issues due to data breaches. Enabling compliance with privacy regulations and safeguarding privacy of all the involved data subjects.

In a second example, a stock video videographer captures background video scenes in public areas such as city streets and parks. Such videos often include passersby and other identifying objects. The videographer uses disclosed embodiments to obfuscate the faces of the captured passersby eliminating any need to obtain releases from those individuals before offering the video clips for use by others. The method further obfuscates any other identifying objects captured in the scenes.

In another example, video of a street scene is captured. The video includes street signs, street address numbers, and vehicle license plates. In this example, the method detects the street signs etc., generates vector representations and checks for previous examples as described above and either replaces the detected object with the corresponding value from a matching key-value pairing, or generates a new value and key for the detected object and both replaces the object with the value and stores the generated key-value pair for later user in other data frames.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
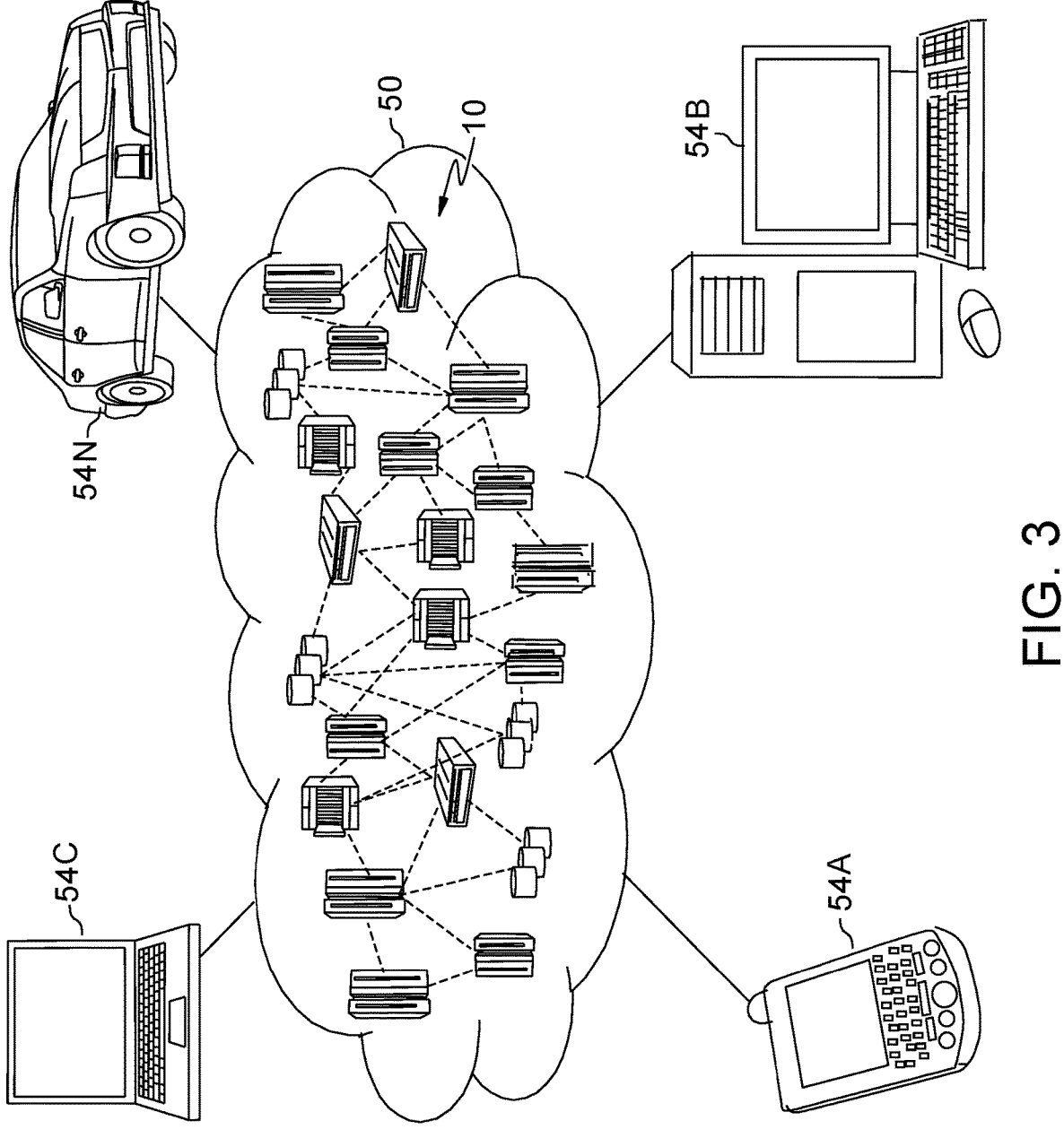
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
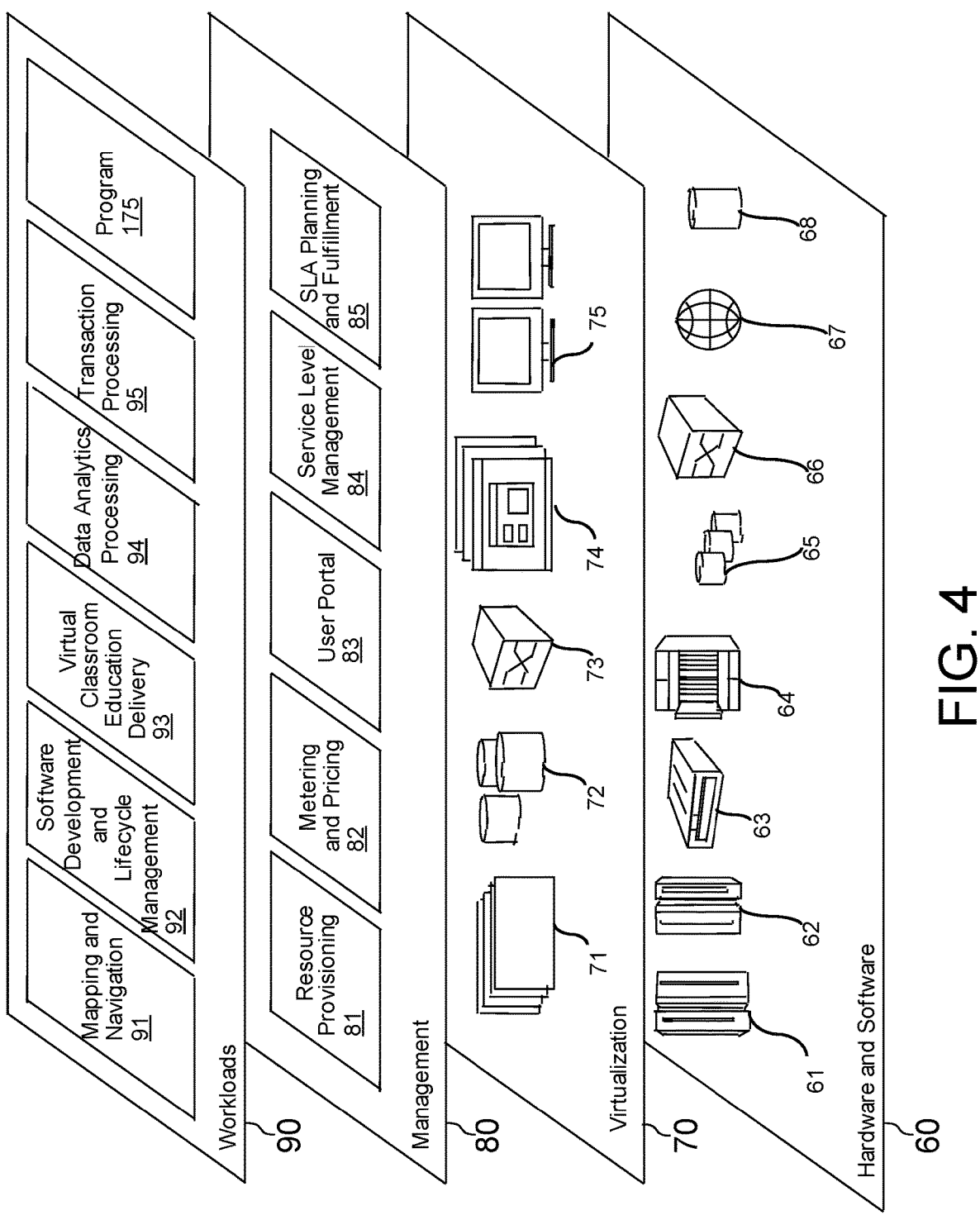
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facial obfuscation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for obfuscating image data, the method comprising:

detecting, by one or more computer processors, an object within a frame of digital image data;

generating, by the one or more computer processors, a key associated with a vector representation of the object, using a hash function;

storing, by the one or more computer processors, the key in a key store matching, by the one or more computer processors, the key to a key/value pair in the key store;

in response to determining that no matching the key/value pair exists in the key store, generating, by the one or more computer processors, a key/value pair comprising a pairing of the key and a value comprising a facial image generated using the detected object, in the key store;

generating, by the one or more computer processors, a revised frame by replacing the object with a value from the matched key/value pair; and providing, by the one or more computer processors, the revised frame.

2. The computer implemented method according to claim 1, further comprising:

generating, by the one or more computer processors, the value from the object; and storing, by the one or more computer processors, the value with the key in the key store.

3. The computer implemented method according to claim 2, wherein generating a value from the object comprises generating the value using a generative adversarial network.

4. The computer implemented method according to claim 1, further comprising generating, by the one or more computer processors, a first vector representation of the object from a first frame; and storing the first vector representation as the key in the key store.

5. The computer implemented method according to claim 4, wherein matching the key comprises:

generating, by the one or more computer processors, a second vector representation of the object from a second frame;

determining, by the one or more computer processors, a distance between the first vector representation and the second vector representation; and comparing, by the one or more computer processors, the distance to a threshold.

6. The computer implemented method according to claim 1, further comprising storing, by the one or more computer processors, the revised frame.

7. The computer implemented method according to claim 1, further comprising receiving, by the one or more computer processors, video image data; and parsing, by the one or more computer processors, the video image data into frames.

8. A computer program product for obfuscating image data, the computer program product comprising one or more computer readable storage devices and collectively stored program instructions on the one or more computer readable storage devices, the stored program instructions comprising:

program instructions to receive a plurality of video image frame data;

program instructions to detect an object within a frame;

program instructions to generate a key associated with a vector representation of the object, using a hash function;

program instructions to store the key in a key store;

program instructions to match the key to a key/value pair in the key store;

program instructions to generate, in response to determining that no matching the key/value pair exists in the key store, a key/value pair comprising a pairing of the key and a value comprising a facial image generated using the detected object, in the key store;

program instructions to generate a revised frame by replacing the object with a value from the matched key/value pair; and program instructions to provide the revised frame.

9. The computer program product according to claim 8, the stored program instructions further comprising:

program instructions to generate the value from the object; and program instructions to store the value with the key in the key store.

10. The computer program product according to claim 9, wherein program instructions to generate a value from the object comprise program instructions to generate the value using a generative adversarial network.

11. The computer program product according to claim 8, the stored program instructions further comprising program instructions to generate a first vector representation of the object from a first frame; and program instructions to store the first vector representation as the key in the key store.

12. The computer program product according to claim 11, wherein the program instructions to match the key comprise:

program instructions to generate a second vector representation of the object from a second frame;

program instructions to determine a distance between the first vector representation and the second vector representation; and program instructions to compare the distance to a threshold.

13. The computer program product according to claim 8, the stored program instructions further comprising program instructions to store the revised frame.

14. The computer program product according to claim 8, the stored program instructions further comprising program instructions to receive video image data; and parsing the video image data into frames.

15. A computer system for obfuscating image data, the computer system comprising:

one or more computer processors;

one or more computer readable storage devices; and stored program instructions on the one or more computer readable storage devices for execution by the one or more computer processors, the stored program instructions comprising:

program instructions to receive a plurality of video image frame data;

program instructions to detect an object within a frame;

program instructions to generate a key associated with a vector representation of the object, using a hash function;

program instructions to store the key in a key store;

program instructions to match the key to a key/value pair in the key store;

program instructions to generate, in response to determining that no matching the key/value pair exists in the key store, a key/value pair comprising a pairing of the key and a value comprising a facial image generated using the detected object, in the key store;

program instructions to generate a revised frame by replacing the object with a value from the matched key/value pair; and program instructions to provide the revised frame.

16. The computer system according to claim 15, the stored program instructions further comprising:

program instructions to generate the value from the object; and program instructions to store the value with the key in the key store.

17. The computer system according to claim 16, wherein program instructions to generate a value from the object comprise program instructions to generate the value using a generative adversarial network.

18. The computer system according to claim 15, the stored program instructions further comprising program instructions to generate a first vector representation of the object from a first frame; and program instructions to store the first vector representation as the key in the key store.

19. The computer system according to claim 18, wherein the program instructions to match the key comprise:

program instructions to generate a second vector representation of the object from a second frame;

program instructions to determine a distance between the first vector representation and the second vector representation; and program instructions to compare the distance to a threshold.

20. The computer system according to claim 15, the stored program instructions further comprising program instructions to store the revised frame.

* * * * *